March 25, 1947. J. ATTIAS 2,418,004
GAS HEATED SOLDERING IRON
Filed Feb. 19, 1944
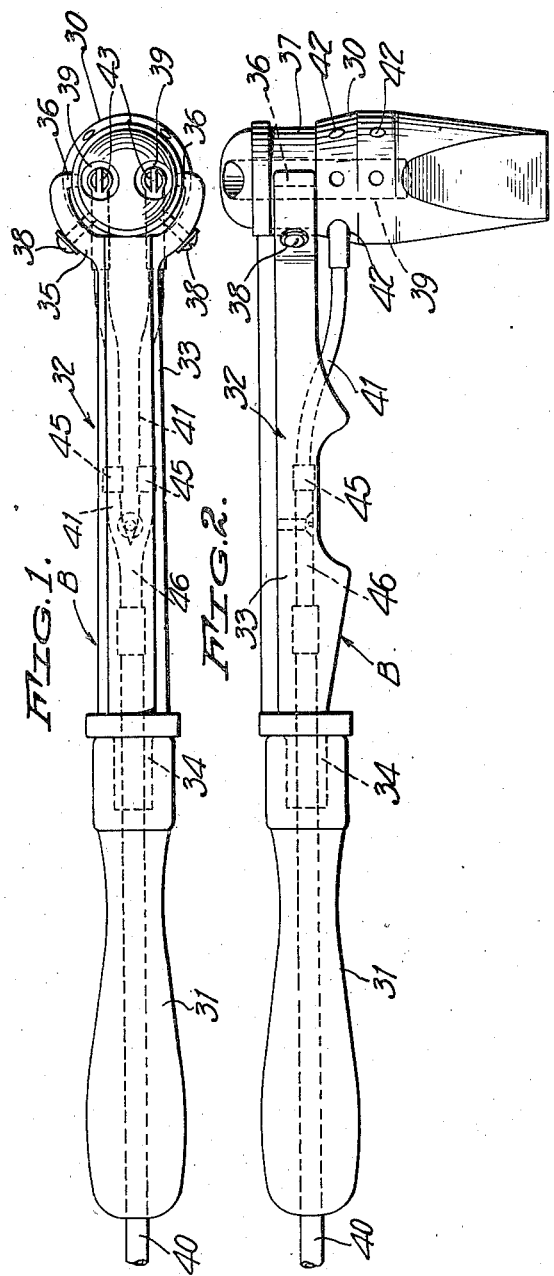
INVENTOR
JOSHUA ATTIAS
BY
Ely + Pattison
ATTORNEYS Patented Mar. 25, 1947

2,418,004

UNITED STATES PATENT OFFICE 2,418,004

GAS HEATED SOLDERING IRON

Joshua Attias, New York, N. Y.

Application February 19, 1944, Serial No. 523,037

2 Claims. (Cl. 158—26)

This invention relates to improvements in soldering irons and more specifically to a soldering iron having self-contained gas heating means.

One of the important features of the invention resides in a soldering iron in which the soldering bit is heated from within the same by the flame of an enclosed gas burner, thereby reducing the danger of fire damage during use of the soldering iron.

Another feature of the invention is to provide a gas heated soldering iron in which the flame from the gas burner is concentrated upon the soldering bit to effect rapid heating thereof, there being suitable means for heat insulating the soldering iron between the bit and the handle to prevent excessive heating of the parts other than the bit.

Other novel features of the invention are to provide a gas heated soldering iron which is light in weight to facilitate easy manipulation of the same when in use and to prevent over-tiring of the hand of an operator during lengthy continuous use; to provide a gas heated soldering iron which is simple and inexpensive in construction, easy to assemble and take apart for cleaning and repair, and which embodies a burner tip for producing jets of flame in the direction of the length of the soldering bit to expedite the heating thereof.

Other features of the invention will become apparent as the following specification is read in conjunction with the accompanying drawings, in which:

Figure 1 is a top plan view of a preferred form of my invention.

Figure 2 is a side elevational view of the soldering iron shown in Figure 1.

In Figures 1 and 2 of the drawing, I have illustrated my soldering iron designated B in its entirety, wherein the solder bit 30 is connected to a handle 31 by a metal arm member 32 formed by a single casting. The arm member 32 includes an elongated channel shaped body portion 33, the open side of which faces down. The one end of the arm member 32 is formed with a reduced tubular extension 34 which extends into and is anchored to the handle 31. The other end of the arm terminates in a fork portion 35, the ends of the fork portion having integral opposed inwardly extending lugs 36—36. The lugs 36—36 are disposed in the reduced neck 37 of the bit 30 in contacting engagement therewith. Screws 38—38 pass through the arms of the fork and thread into threaded recesses in the neck 37 for rigidly and removably securing the bit to the arm member 32. By reason of the specific connection between the bit and the arm member, only a minimum portion of the arm is in direct heat exchange relation with the bit 30, thus preventing excessive heating up of the arm member 32.

A gas supply tube or pipe 40 extends axially through the handle 31 and is connected to a Y-coupling 46, the same being nested within the channel of the arm member 32. The inner ends of a pair of branch tubes 41—41 are connected by coupling sleeves 45 to the Y-coupling. The outer ends of the tubes 41 are downwardly offset and extend horizontally through openings 42 into the respective chambers 39—39. Crown shaped burner tips 43 are fitted to the free ends of tubes 41—41 and are disposed within and in spaced relation to the walls of the chambers 39—39. Lighting and air openings 42 are provided in the bit and open into the chambers 39—39.

Gas flows through the tube 40, Y-coupling 46, branch tubes 41—41 to burner tips 43. Air to support combustion of the gas at the tips enters the chambers 39—39 through openings 42. When lighted, the flame from the burner tips will extend in the direction of the walls of the chambers 39 and effect a rapid heating up of the bit 30 for soldering purposes.

While I have shown and described what I consider to be the most practical embodiments of my invention, I wish it to be understood that such changes in construction and design as come within the scope of the appended claims may be resorted to if desired without departing from the spirit of the invention.

Having thus described the invention, what I claim as new and desire to secure by Letters Patent of the United States is:

1. A gas heated soldering iron comprising an arm member, a handle secured to one end of said arm member and being coextensive therewith, a solder bit, means for detachably connecting the solder bit to the other end of said arm member with its axis at right angle to the length of said arm member, said bit having a pair of separate combustion chambers therein which open through the top thereof, a gas supply tube extending axially through said handle and having a portion in parallel relation to said arm member and in close relation thereto, a pair of branch tubes having their outer ends downwardly offset and extending into the respective combustion chambers through openings in the walls thereof, and a Y-coupling connecting the inner ends of the branch tubes to the gas supply tube, said bit having air and lighting openings establishing communication with the exterior thereof and said combustion chambers.

2. A gas heated soldering iron comprising an arm member, a handle secured to one end of said arm member, a solder bit, means for detachably connecting the solder bit to the other end of said arm member with its axis at right angle to the length of said arm member, said bit having a pair of separate combustion chambers therein which open through the top thereof, a gas supply tube extending through said handle and having a portion disposed in close relation to said arm member, a pair of branch tubes having their outer ends extending into the respective combustion chambers through openings in the walls thereof, and a coupling means connecting the inner ends of the branch tubes to the gas supply tube, said bit having air and lighting openings therein establishing communication with the exterior thereof and said combustion chambers.

JOSHUA ATTIAS.

REFERENCES CITED

The following references are of record in the file of this patent:

UNITED STATES PATENTS

| Number | Name | Date |
|---|---|---|
| 712,938 | Kaufman | Nov. 4, 1902 |
| 2,344,196 | Attias | Mar. 14, 1944 |
| 1,134,165 | Stichler | Apr. 6, 1915 |
| 718,034 | Thorngren | Jan. 6, 1903 |
| 613,586 | Mitchell | Nov. 1, 1898 |
| 1,476,948 | Callender | Dec. 11, 1923 |
| 1,954,503 | Suess | Apr. 10, 1934 |

FOREIGN PATENTS

| Number | Country | Date |
|---|---|---|
| 233,550 | German | Apr. 13, 1911 |